(12) United States Patent
Baker et al.

(10) Patent No.: US 12,503,255 B2
(45) Date of Patent: Dec. 23, 2025

(54) LOITERING CRAFT (71) Applicant: REGENT Craft Inc., North Kingstown, RI (US)

(72) Inventors: William Bryan Baker, Cohasset, MA (US); Cory Asher Kays, Fort Thomas, KY (US); William Thalheimer, Waltham, MA (US)

(73) Assignee: REGENT Craft Inc., North Kingstown, RI (US)

( * ) Notice: Subject to any disclaimer, the term of this patent is extended or adjusted under 35 U.S.C. 154(b) by 0 days.

(21) Appl. No.: 18/929,946

(22) Filed: Oct. 29, 2024

(65) Prior Publication Data

US 2025/0135817 A1 May 1, 2025

Related U.S. Application Data (60) Provisional application No. 63/546,501, filed on Oct. 30, 2023.

(51) Int. Cl.
| | | |
|---|---|---|
| *B64U 30/14* | (2023.01) | |
| *B60F 5/02* | (2006.01) | |
| *B64C 1/06* | (2006.01) | |
| *B64C 1/32* | (2006.01) | |
| *B64C 5/08* | (2006.01) | |
| *B64C 9/02* | (2006.01) | |
| *B64C 39/06* | (2006.01) | |

(52) U.S. Cl.
CPC ............... *B64U 30/14* (2023.01); *B60F 5/02* (2013.01); *B64C 1/069* (2013.01); *B64C 1/32* (2013.01); *B64C 5/08* (2013.01); *B64C 9/02* (2013.01); *B64C 39/068* (2013.01)

(58) Field of Classification Search
CPC ...... B64U 30/14; B64U 20/40; B64C 39/068; B64C 2211/00; B64C 1/32; B64D 25/12
See application file for complete search history.

(56) References Cited

U.S. PATENT DOCUMENTS

| | | |
|---|---|---|
| 1,840,716 A | 1/1932 | Hitt |
| 1,881,141 A | 10/1932 | Igor |
| 2,214,945 A | 9/1940 | Weihmiller |
| 2,400,173 A | 5/1946 | Slate |

(Continued)

FOREIGN PATENT DOCUMENTS

| | | |
|---|---|---|
| CN | 107010199 | 12/2021 |
| DE | 20 2016 000269 U1 | 2/2016 |

(Continued)

OTHER PUBLICATIONS

International Search Report and Written Opinion in International application No. PCT/US2024/058436 dated Feb. 20, 2025 (78 pages).

(Continued)

*Primary Examiner* — Nicholas McFall
(74) *Attorney, Agent, or Firm* — Crowell & Moring LLP (57) ABSTRACT

A craft is provided comprising: a propulsion system; a fuselage coupled with the propulsion system, wherein the fuselage is configured to carry a payload and fuel for the propulsion system; and a pre-assembled wing coupled with the fuselage; wherein the craft is designed to take-off without using a runway and does not have landing gear to land.

18 Claims, 10 Drawing Sheets

(56) References Cited

U.S. PATENT DOCUMENTS

| | | | |
|---|---|---|---|
| 2,942,810 | A | 6/1960 | Hanning-Lee |
| 3,139,059 | A | 6/1964 | Hanford |
| 3,498,247 | A | 3/1970 | Handler |
| 4,080,922 | A | 3/1978 | Brubaker |
| 4,449,683 | A | 5/1984 | Kratzer et al. |
| 4,484,721 | A | 11/1984 | Gue |
| 4,499,843 | A | 2/1985 | Williams |
| 4,926,773 | A | 5/1990 | Manor |
| 4,930,725 | A | 6/1990 | Thompson et al. |
| 5,009,374 | A * | 4/1991 | Manfredi ................. F42B 3/006 102/378 |
| 5,018,686 | A | 5/1991 | Zimmer |
| 5,100,081 | A | 3/1992 | Thomas |
| 6,547,181 | B1 | 4/2003 | Hoisington et al. |
| 6,732,672 | B2 | 5/2004 | Shin |
| 7,275,493 | B1 | 10/2007 | Brass |
| 7,322,872 | B2 | 1/2008 | Butler et al. |
| 7,744,038 | B2 | 6/2010 | Sankrithi et al. |
| 7,934,682 | B2 * | 5/2011 | Manfredi ................. F42B 3/006 244/139 |
| 8,651,431 | B1 | 2/2014 | White et al. |
| 8,876,044 | B2 | 11/2014 | Cazals et al. |
| 9,010,678 | B1 * | 4/2015 | Hiller ..................... B64C 37/00 244/2 |
| 9,156,550 | B2 | 10/2015 | Nam |
| 9,688,356 | B2 | 6/2017 | Schulz |
| 9,889,920 | B2 | 2/2018 | Harding et al. |
| D843,919 | S | 3/2019 | Tzarnotzky et al. |
| 10,507,930 | B2 | 12/2019 | Keller |
| D872,681 | S | 1/2020 | Tzarnotzky et al. |
| D873,200 | S | 1/2020 | Langford et al. |
| D873,202 | S | 1/2020 | Tzarnotzky et al. |
| D921,565 | S | 6/2021 | Vander Lind |
| 11,124,283 | B1 * | 9/2021 | Kennedy ................... B64C 1/26 |
| 11,370,508 | B1 | 6/2022 | Dugger et al. |
| 11,420,738 | B1 | 8/2022 | Thalheimer et al. |
| D966,147 | S | 10/2022 | Merrill |
| D988,226 | S | 6/2023 | Bevirt et al. |
| D988,926 | S | 6/2023 | Prager et al. |
| D996,339 | S | 8/2023 | Moris et al. |
| 11,787,551 | B1 | 10/2023 | Graves et al. |
| D1,005,211 | S | 11/2023 | Cummings |
| D1,007,366 | S | 12/2023 | Moris et al. |
| D1,009,696 | S | 1/2024 | Tao et al. |
| D1,009,697 | S | 1/2024 | Hesselbarth |
| 12,006,033 | B1 | 6/2024 | Villa et al. |
| 12,006,035 | B1 | 6/2024 | De Paiva et al. |
| 12,006,048 | B2 | 6/2024 | Bevirt et al. |
| 12,017,764 | B2 | 6/2024 | Long |
| 12,084,173 | B2 | 9/2024 | Schaefer |
| 12,116,139 | B2 | 10/2024 | Klinker et al. |
| 12,129,887 | B2 | 10/2024 | Halcom |
| D1,051,012 | S | 11/2024 | Alafinov |
| D1,053,780 | S | 12/2024 | Tran et al. |
| 2007/0245943 | A1 | 10/2007 | Rice |
| 2014/0312177 | A1 | 10/2014 | Gaonjur |
| 2016/0280332 | A1 | 9/2016 | Schulz et al. |
| 2017/0327218 | A1 * | 11/2017 | Morin ..................... B64C 3/385 |
| 2019/0291863 | A1 | 9/2019 | Lyasoff et al. |
| 2022/0250743 | A1 | 8/2022 | Thalheimer et al. |
| 2022/0324560 | A1 | 10/2022 | Klinker et al. |
| 2022/0382300 | A1 | 12/2022 | Larson et al. |
| 2023/0021836 | A1 | 1/2023 | Riddle et al. |
| 2023/0062717 | A1 | 3/2023 | Thalheimer et al. |
| 2024/0158091 | A1 | 5/2024 | Klinker et al. |
| 2024/0182157 | A1 | 6/2024 | Ivanco |
| 2024/0182165 | A1 | 6/2024 | Skulskis |
| 2024/0190567 | A1 | 6/2024 | Vora et al. |
| 2024/0208646 | A1 | 6/2024 | Bower |
| 2024/0208648 | A1 | 6/2024 | Klinker et al. |
| 2024/0208658 | A1 | 6/2024 | Graves et al. |
| 2024/0326990 | A1 | 10/2024 | Buskirk et al. |

FOREIGN PATENT DOCUMENTS

| | | |
|---|---|---|
| EP | 2605955 B1 | 2/2020 |
| EP | 3018053 | 5/2023 |
| GB | 2347909 | 9/2000 |
| RU | 2661277 | 7/2018 |
| WO | WO 2022/173948 A1 | 8/2022 |
| WO | WO 2023/091202 A1 | 5/2023 |

OTHER PUBLICATIONS

Ex Parte Quayle Action in U.S. Appl. No. 29/874,053 dated Feb. 19, 2025 (30 pages).

"Electric 'seagliders' that skim overwater could make ferries a thing of the past" CNN.com travel post Published Jun. 12, 2024. Retrieved Feb. 18, 2025 Available online at: https://www.cnn.com/travel/regent/electric-seadgliders-abudhabi-spc/index.html (2021) (13 pages).

"Electric seaplane maker secures first order en route to accelerate ecofriendly air travel" electrek.co. post published Mar. 21, 2023, retrieved Feb. 18, 2025. Available online at https://electrek.com/2023/03/21/electric-seaplane-maker-secures-first-order (2021) (8 pages).

Van Beek, C.M., et al., "Progress Report on Aerodynamic Analysis of a Surface Piercing Hydrofoil-Controlled Wing-In-Ground Effect SEABUS Configuration" Presented at RTO AVT Symposium on "Fluid Dynamics Problems of Vehicles Operating near or in the Air-Sea Interface," held in Amsterdam, The Netherlands, Oct. 5-8, 1998 and published in RTO MP-15 (21 pages).

Alcock, Charles, "How Electric Propulsion and Blown-Wing Technology Have Liberated Aircraft Design", Jan. 14, 2022 (3 pages).

"Geyiie Die Cast Airplanes Toys, Army Plane Toys Set for Kids 3-12, Fighter Jet Military Transport Helicopter with Rot . . . " amazon.com., post Published Unavailable. Retrieved May 28, 2024. Available online at URL:https://www.amazon.com/Geyiie-Airplanes-Military-Transport-Helicopter/dp/B0CCCMPTWD/ref=sr (Year: 2021).

"LM19-A Drone with Camera for Beginners, WiFi Live Video Remote Control Drones for Kids 8-12, Easy & . . . " amazon.com, post Published Aug. 24, 2023. Retrieved May 28, 2024. Available online at URL:https://www.amazon.com/LMRC-Beginners-Airplane-Quadcopter-Batteries/dQ/B0CGHRNHMS/ref=sr_1_7?crid=t (Year: 2023).

Gavrilović, N. et al., "Commercial Aircraft Performance Improvement Using Winglets", *FME Transactions*, vol. 43, No. 1, Jan. 2015 (8 pages).

Dimino, I., et al., "Integrated Design of a Murphing Winglet for Active Load Control and Alleviation of Turboprop Regional Aircraft" *Applied Sciences*, vol. 11, No. 5, Mar. 9, 2021 (27 pages).

"Canard (Aeronautics)"; Wikipedia page; downloaded from the Internet on Mar. 21, 2024 at https://en.wikipedia.org/wiki/Canard (aeronautics); Mar. 4, 2021 (12 pages).

Rutan Long-EZ, Wikipedia page; downloaded from the Internet on Mar. 21, 2024 at https://en.wikipedia.org/wiki/Rutan_Long-EZ; Mar. 9, 2023 (6 pages).

Northrop Grumman B-2 Spirit; Wikipedia page; downloaded from the Internet on Mar. 21, 2024 at htth://en.wikipedia.org/wiki/Northrop_Grumman_B-2_Spirit; Oct. 8, 2019 (34 pages).

"Aileron"; Wikipedia page; downloaded from the Internet on Mar. 21, 2024 at https://en.wikipedia.org/wiki/Aileron; Oct. 31, 2019 (9 pages).

International Preliminary Report on Patentability in International Application No. PCT/US2022/015979, dated Aug. 15, 2023 (10 pages).

International Search Report and Written Opinion in International Application No. PCT/US2022/040012 dated Nov. 17, 2022 (11 pages).

International Preliminary Report on Patentability in PCT/US2022/040012, dated May 2, 2024 (8 pages).

International Search Report and Written Opinion in International Application No. PCT/US2022/015979 dated May 30, 2022 (14 pages).

International Search Report and Written Opinion in International Application No. PCT/US2024/048937, dated Nov. 6, 2024 (13 pages).

(56) References Cited

OTHER PUBLICATIONS

Notice of Allowance in U.S. Appl. No. 29/874,061, dated Nov. 1, 2024 (5 pages).

* cited by examiner

LOITERING CRAFT

CROSS-REFERENCE TO RELATED APPLICATION

This application claims the benefit of U.S. Provisional Patent Application No. 63/546,501, filed Oct. 30, 2023, which is hereby incorporated by reference.

BACKGROUND

A craft makes use of control surfaces to change aerodynamic forces to maneuver the craft. Some crafts are capable of traveling above water while remaining close to the surface of the water. One example of such a craft is a wing-in-ground effect vehicle, which can include a propulsion source and aerodynamic surfaces, that is designed to operate close to the water surface in aerodynamic ground effect.

DETAILED DESCRIPTION

I. Introduction

A wing-in-ground effect (WIG) aircraft flies near to the surface of the earth (ground or water) gaining increased aerodynamic efficiency by trapping high pressure air under the wing which extends wing tip vortices making the span seem artificially larger. When such a craft flies relatively close to the surface, the drag experienced by the craft is reduced. For example, the drag on a WIG aircraft is reduced when its distance from the ground is within about half the length of the aircraft's wingspan.

In one embodiment, a craft is designed as a wing-in-ground-effect craft that is designed to fly in extreme ground effect, to use a very short, land-based takeoff (e.g., takeoff/launch from a vehicle or small path, etc.), and without landing requirements (e.g., craft does not include any landing gear, etc.). By being capable of land-based takeoff (as compared to a water-based takeoff), the craft does not need a hull or hydrofoils or other components used in a water-based takeoff. This reduces the cost, weight, and complexity of the craft. Further, not including landing gear also reduces the cost, weight, and complexity of the craft. Reducing the weight of the craft may be desired for ease of transporting, assembly, and positioning the craft for land-based takeoff.

Ground effect can refer to a scaling of the height the craft flies proportional to the chord length of the wing. As used herein, "extreme ground effect" can refer to a scaling proportional that is no greater than one chord length (e.g., <0.25 or 0.1 of the length of a chord). The craft includes a fuselage, an aero system (e.g., including a wing and possibly a tail), and a propulsion mechanism, such as, for example, a motor and propeller system. The fuselage may be a cigar-shaped tube that can include a payload, fuel, propulsion/guidance navigation control system, electronics, sensors, batteries, etc. In some embodiments, the fuselage also contains a backup water-propulsion system. The aero system may be a flying box wing. The wing can be preassembled with spar/ribbing covered with very lightweight skin material (e.g., Clysar®), and the tail can attach to the wing directly (not to the fuselage) in a box-tail structure (also referred to as box wing). The propulsion system may, for example, be a pusher-propeller configuration and can include a motor and propeller system that attach to the top/rear of the fuselage.

In some embodiments, the craft has the ability to drop or disengage the fuselage from the wing structure. In some embodiments, a control system (e.g., including a controller/processor, actuators, etc.) is used to disengage the fuselage from the wing structure based on the determination of a condition. For example, a control system may cause the fuselage to disengage from the wing structure if the control system determines that the wing structure has been damaged or is likely to be damaged with the current trajectory. In another example, a control system may cause the fuselage to disengage from the wing structure if the control system determines that the flight path has reached a point at which the craft should continue the journey in the water. In yet another example, a control system may cause the fuselage to disengage from the wing structure if the control system determines that the fuselage is approaching or submerged in water. Other examples exist. The control system may make one or more of these determinations based on, for example, sensor data received from onboard or remote sensor(s), command(s) received over communication channel(s) from a remote source, a time duration has exceeded a threshold, a distance traveled has exceeded a threshold, etc.

In some embodiments, the fuselage contains an optional backup water-propulsion system that can be engaged when the fuselage has been disengaged from the aero system and enters the water. In some example embodiments, the control system can initiate the backup water-propulsion system based on determining that the fuselage is submerged in water and/or the propulsion system fails. Other examples exist.

In some embodiments, the control of the craft is based on a simple sensor design for pitch, roll, and height detection, and a simple and relatively-inexpensive sensor system (e.g., a camera-based system) for forward navigation.

In some embodiments, the craft can takeoff using a ground-mount slingshot, which removes runway or water takeoff requirements. In other embodiments, the craft can takeoff using self propulsion while mounted on a small rail system, a dolly, or a droppable landing gear structure.

In some embodiments, the craft can be provided in a kit that is designed to be shipped in a standard (e.g., 20') CONEX container and assembled remotely. The kit can contain the fuselage, pre-assembled wing, preassembled tail top, tail sides, and the propulsion system. In one embodiment, the fuselage can slide into the back of the wing structure, and some or all of the joints/connection of parts can be "pin joints" that can be easily connected (e.g., by a non-aircraft-type personnel).

In one example implementation (other implementations can be used), the target operational parameters are (1) Control: unmanned, autonomous or remote controlled; (2) Takeoff: land launch with shortest takeoff distance possible (e.g., vehicle mounted launch mechanism); (3) Landing: not required (e.g., the craft does not require landing gear/control logic/systems); (4) Altitude: very low (but above water) (~2 m); (5) Payload: approx 400 lbs; (6) MTOW (max takeoff weight): <1300 lbs; (7) Speed: approx 70-80 kts; (8) Range: 300-400 miles; (9) Cruise L/D: ~15; (10) Wingspan: <20 ft; and (11) Aspect ratio: ~2.5 (large wing not needed for takeoff).

II. Example Craft Design

Figure 1A:
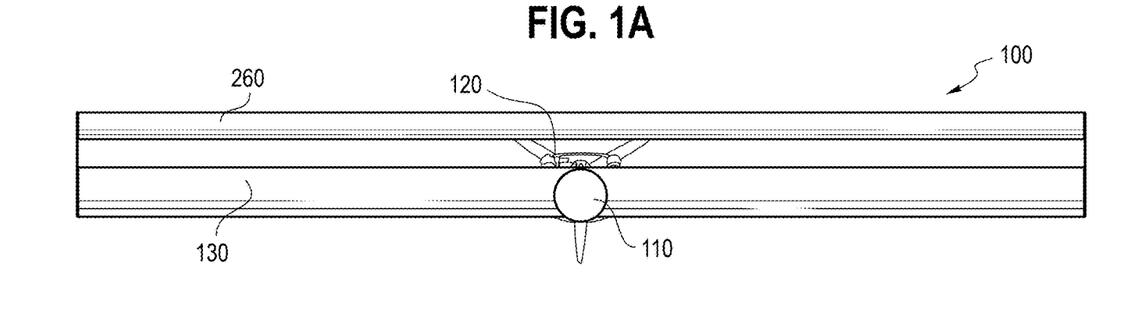
FIGS. 1A-D are views of an example craft of an embodiment.
Figure 1B:
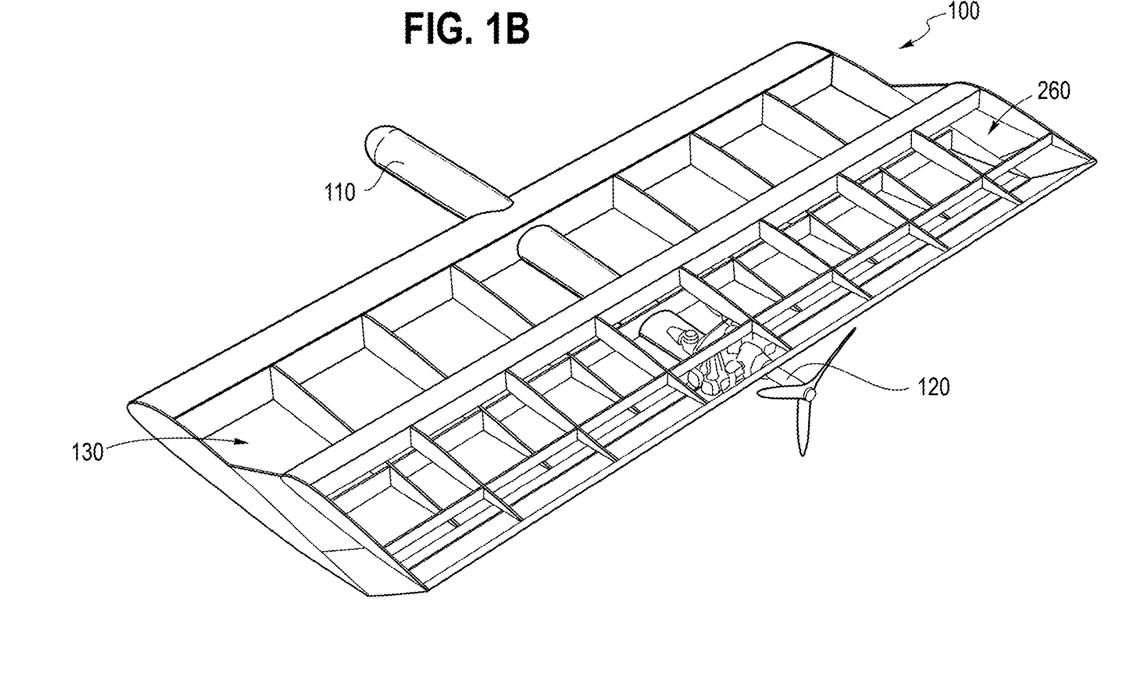
Figure 1C:
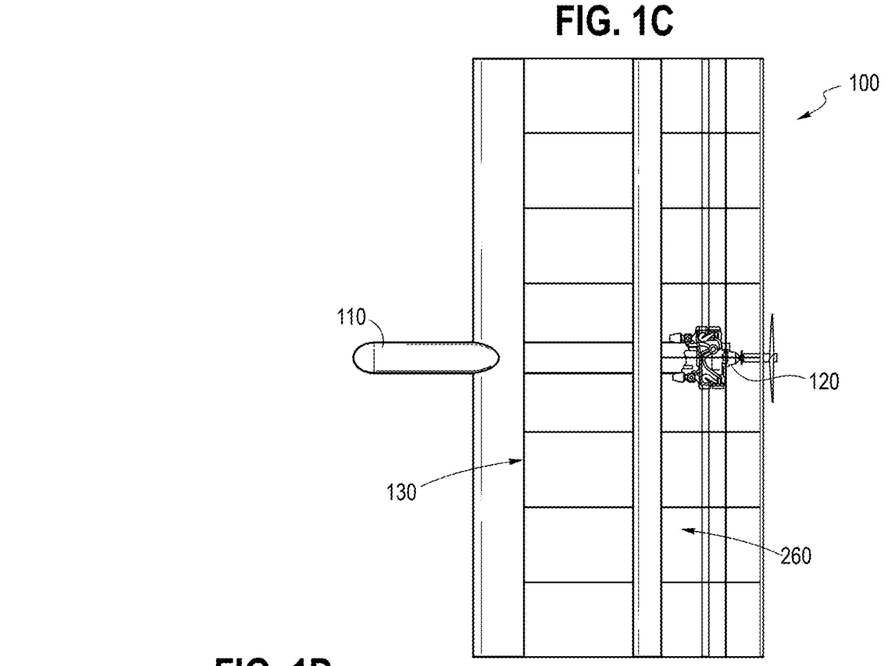
Figure 1D:
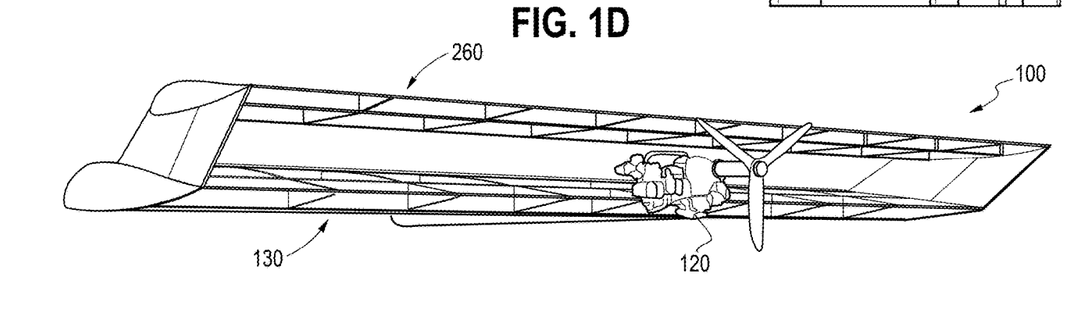
Figure 2:
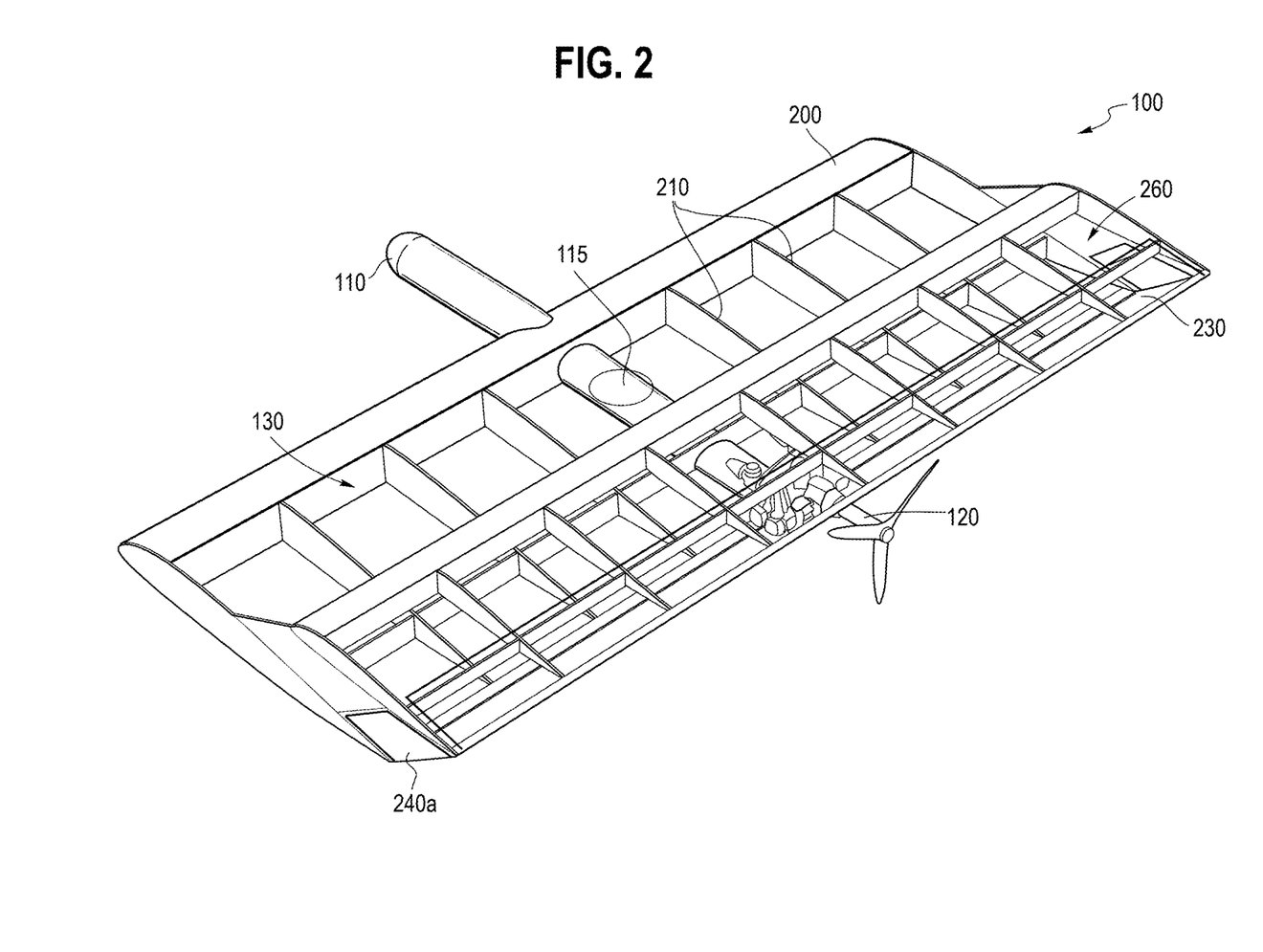
FIG. 2 is a rear perspective view of an example craft of an embodiment.
Figure 3:
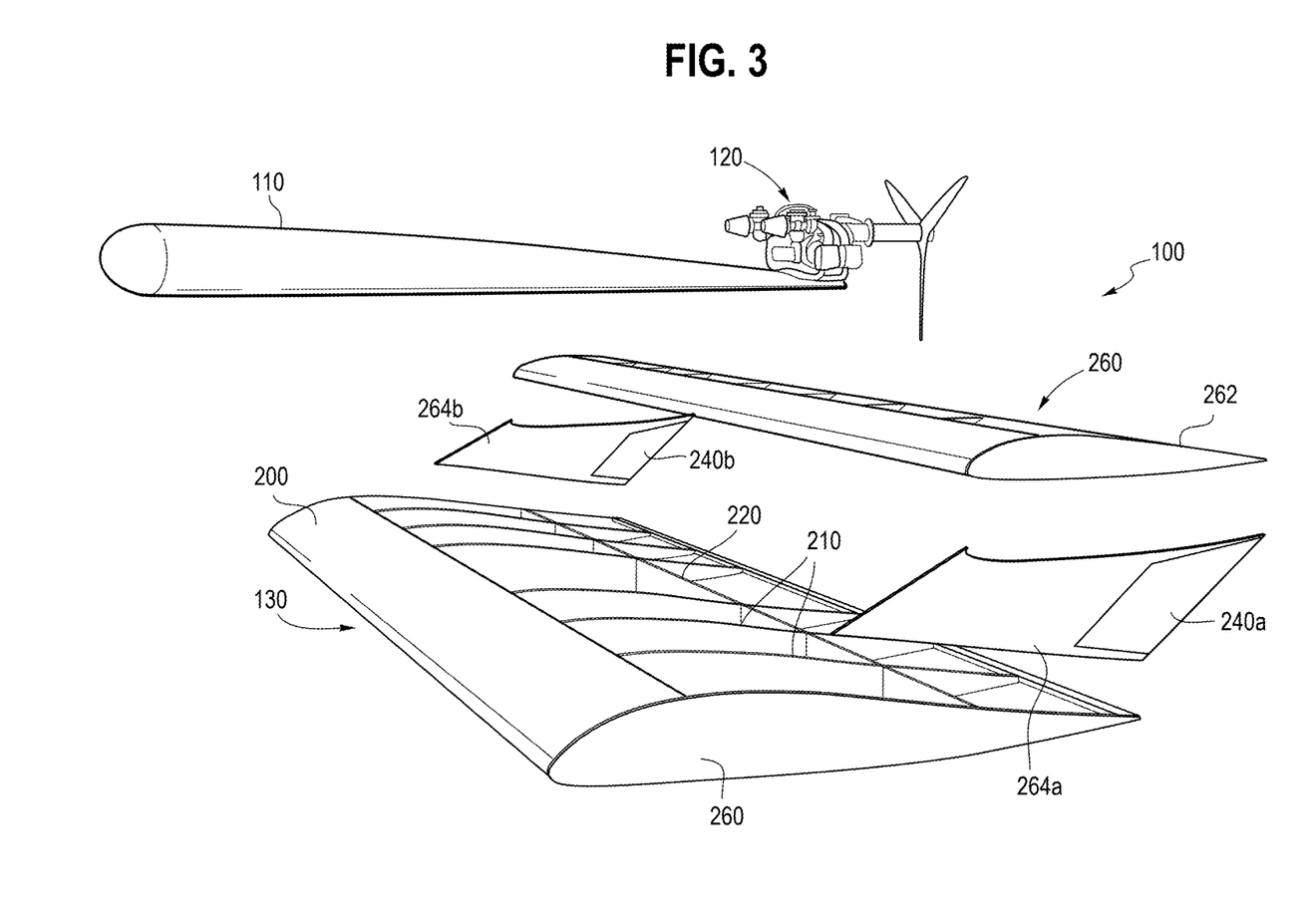
FIG. 3 is an exploded view of an example craft of an embodiment.

Turning now to the drawings, FIGS. 1A-1D are views of an example craft 100 of an embodiment. FIG. 2 is a rear perspective view of the craft 100, and FIG. 3 is an exploded view of the craft 100. As shown in these drawings, the craft 100 of this embodiment comprises a fuselage 110, a propulsion system 120 (e.g., motor, propeller, etc.), a pre-assembled wing 130, and a tail 260. FIG. 2 indicates an approximate center of gravity (CG) point 115, which can also be a location in the fuselage 110 to store fuel for the propulsion system 120. As shown in more detail in FIGS. 2 and 3, the wing 130 comprises a D-tube (spar) 200, ribs 210, an aft spar 220, elevator(s) 230, and a reflexed airfoil (shape) 250. The craft 100 also comprises a box tail 260 having a top 262 and two side panels 264a and 264b, wherein the two side panels are coupled with the wing 130 and the top 262. The bottom of the box tail is formed by the wing 130 itself. It should be noted that the side panels 264a and 264b shown in the exploded view of FIG. 3 are not part of the reflexed airfoil design. Also, the trailing edge of the airfoil can be "pulled up" in a more dramatic fashion to accomplish an increased reflexed airfoil design. Further, the side panels 264a and 264b shown here can also include respective rudders 240a and 240b hung off the rear of the side panels for additional control authority.

The following paragraphs provide example implementation details of these components. It should be understood that these are merely examples and that other implementations can be used.

Turning first to the fuselage 110, the fuselage 110 can have a robust cigar-shaped tube structure that can include a payload, fuel, propulsion/guidance navigation control system, electronics, sensors, batteries, etc. The payload can be located at the front of the craft 100. The fuel can be located at or near the center of gravity 115 of the craft 100. This ensures that the center of gravity 115 of the craft 100 does not change significantly during flight (e.g., as fuel is spent) and reduces (or eliminates) the requirement to add significant ballasts to the craft.

The fuselage 110 can also carry a navigation control system including, but not limited to, sensors and a computer system for processing sensor data, receiving communications (e.g., commands), sending communications (e.g., health information), storing information, controlling actuation systems, etc. The computer system can comprise, for example, one or more processors configured to execute computer-readable program code stored in one or more non-transitory storage medium(s) to cause the one or more processors to, individually or collective, perform at least some of the functions described herein and, optionally, other functions. The computing system can also comprise, for example, one or more communication interfaces for receiving and/or sending information. The fuselage 110 can also comprise, for example, electronics and batteries.

In this embodiment, the fuselage 110 also carries the propulsion system 120 (in this example, the propulsion system 120 is mounted to the top of the fuselage 110). The propulsion system 120 can be positioned backwards/forwards on the fuselage 110 (similar to the aero-system, as described below) to adjust the position of the center of gravity depending on the payload, etc. In one embodiment, the propeller length of the propulsion system 120 can change depending on where the fuselage is placed relative to the aero system. This can be implemented, for example, by mounting the propellers on an adjustable length shaft. This may be required, for example, to avoid the propellers making contact with elements of the aero system and/or launching platform. The position of the fuselage 110 relative to the aero structure can be dependent on the payload including its weight distribution in particular.

Although not shown in the drawings, the craft 100 can also contain an optional backup propulsion system, such as a solid fuel combustor (e.g., solid rocket motor), at the rear of the fuselage 110. In the event the propulsion system fails and/or the fuselage 110 is detached from the wing/tail structure, the backup propulsion system can be used to propel the fuselage 110 forward in water.

Any suitable attachment design can be used to attach the various components of the craft 100 together. For example, the propulsion system 120 can be mounted on the top/rear of the fuselage 110, and the wing 130 can be mounted in a plurality of positions. Attachments can be used to maintain structural integrity on the top of the tube and can be positioned (forward/reverse) to optimize for the center of gravity for a given payload, configuration, etc. The propeller shaft can also be adjusted in size to avoid collision with the tail if the fuselage is moved forward or aft. In one example implementation, a simple pin joint arrangement with minimum electrical connectors is used that can be relatively easy to release.

In some situations, the fuselage 110 can be used with the payload by itself without an aero system, if necessary. Also, the fuselage 110 can be mounted on a launching platform to launch the example craft 100 from land without requiring a runway (e.g., the craft does not require wheels, a hull, a hydrofoil for water takeoff, etc.). The fuselage 110 can be neutrally buoyant and include a transponder within the buoyant structure so that it can be retrievable from water, if desired. Alternatively and/or additionally, a transponder can be tethered to the structure of the fuselage 110.

The aero-system of the craft is expendable in one implementation, so it can be designed to be relatively inexpensive and light. In one embodiment, the aero-system is a flexible system that can "break-away" from the fuselage 110 (e.g., emergency situations and/or planned operational situations). Also, the aero-system can be positioned forward/backward on the fuselage 110 depending on the payload to adjust for the center of gravity 115. This reduces or avoids the need to ballast the system out for different payloads.

As noted above, in this example embodiment, the wing 130 has a structure that includes spar(s) 200, 220, ribs 210, and a skin that makes up the surface of the wing 130. The skin can be a flexible membrane such as, for example, a very lightweight structural material, film, or fabric material (e.g., Clysar®). The spars are arranged substantially perpendicular to the fuselage 110. They are the main structural members and may be implemented, for example, as a D-tube 200 in the front of the wing 130. Additionally, the aft spar 220 may take up the half load. The aft spar 220 may be, for example, built using flat plate carbon. In one example, one-core-one ply layout with Nomex honeycomb structure as fill in between two layers of carbon is used, where the carbon layers are separated by a thin non-carbon layer (e.g. Nomex). The ribs 210 are arranged substantially parallel to the fuselage 110 and may be, for example, built using flat plate carbon construction similar to the aft spar 220. The wing may be shaped in a reflexed airfoil shape 250. The wing may include one or more aerodynamic control surfaces such as, for example, flaps or flaperons. Flaps or flaperons (not shown) may be the full width of the wing 130 or may consist of several smaller flaps or flaperons.

The box tail 260 contains control surfaces, such as rudders 240a and 240b implemented on the side panels 264a and 264b, respectively. The rudders 240a and 240b may comprise a movable hinged surface on the trailing edge of the side panels 264a and 264b, respectively, to control the yaw of the craft 100. The tail 260 can have tail flaps or elevator(s) 230 for pitch control. The elevator(s) can be implemented across the full length of the tail, can be a flying tail where a stabilizer and an elevator move together, or can have an entire length that may elevate across the tail. In FIG. 2, an example is shown where an elevator 230 is implemented across the full length of the tail. The proportion of the tail with respect to the other components can vary depending on the design.

In operation, flight of the craft 100 can be controlled using pusher-propeller propulsion and aero-system control (flaps, ailerons, flaperons, rudders, elevators, etc.) to guide the craft 100 to a destination. The craft 100 has the ability to drop (or disengage) the fuselage 110 from the wing structure 120, with an optional backup water-propulsion system. The craft 100 can make a determination to drop the fuselage 110 from the wing structure 120. For example, a control system (e.g., with one or more processors executing computer-readable program code) can detect the craft 100 is within a threshold distance to the water and make a determination to drop the fuselage 110 (and, optionally, activate a backup propulsion system to continue to propel the fuselage forward toward a destination). In one example, the release can happen after detecting that the craft 100 hit the water (e.g., using a simple sensor). To drop the fuselage 110, the control system can cause pin connectors connecting the fuselage 110 to the aero system to be released (e.g., using a hydraulically-activated or electrically-activated system to release a pin) or to be destroyed (e.g., incendiary). In this way, the connectors can operate as a "hook" that could be activated for release. Alternatively, instead of releasing the fuselage, the control system can cause the fuselage to be destroyed (e.g., by exploding the fastener to the fuselage 110). Other triggers for detachment can be used and can be activated locally or remotely. Another trigger can be based on a threshold distance to a destination or when/if the craft 100 has traveled a certain amount of distance (e.g., using a laser to "bounce back" an indication of how close the craft 100 is to the destination). Yet another trigger can be a signal from a remote device (e.g., over a communications interface with one or more processors executing computer-readable program code). In yet another example, a control system can detect the craft 100 is being attacked and make a determination to drop the fuselage 100.

Figure 4:
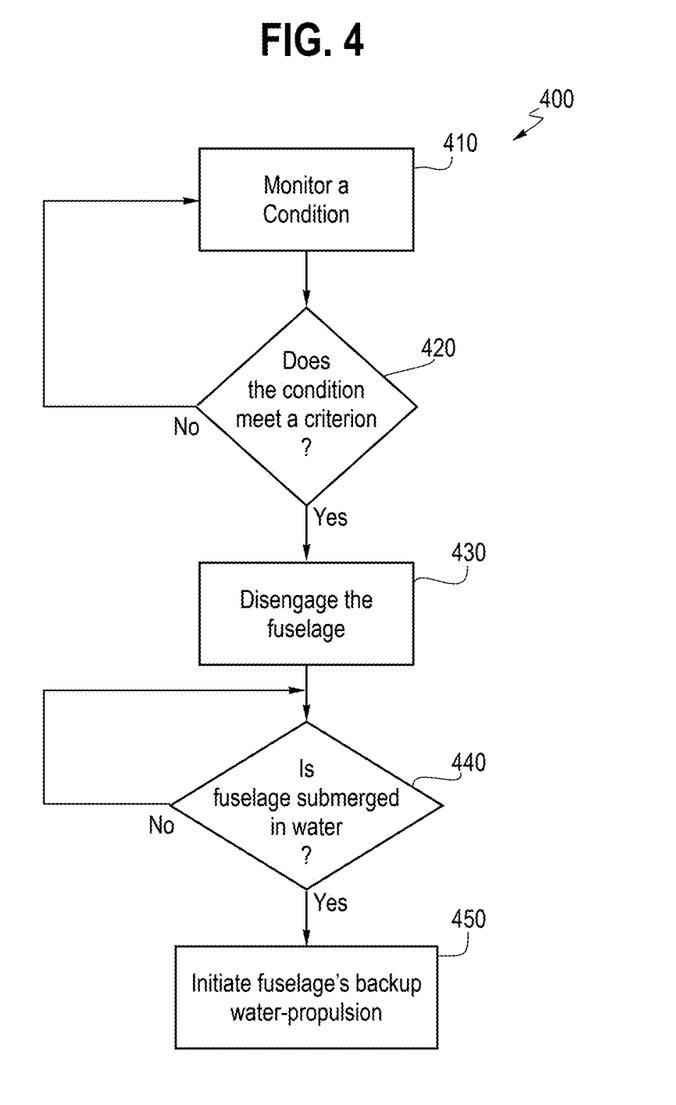
FIG. 4 is a flow chart of an example method for disengaging a fuselage of a craft of an embodiment.

FIG. 4 is a flow chart 400 of an example method for dropping a fuselage of a craft of an embodiment. As shown in FIG. 4, in this embodiment, the control system of the craft 100 monitors a condition (act 410) and determines if the condition meets a criterion (act 420). For example, the control system can determine (e.g., using a sensor that generates a signal when wet) if the fuselage 100 is approaching or submerged in water, if the wing structure has been damaged or is likely to be damaged with the current trajectory, if the flight path has reached a point at which the craft 100 should continue the journey in the water, if a transmission from a remote device has been received, if a time duration has exceeded a threshold, and/or if a distance traveled has exceeded a threshold, etc. These are merely examples, and other conditions can be monitored. After the condition meets the criterion, the control system disengages/drops the fuselage (act 430). For example, the control system can send a message to one or more controllers to disengage one or more connecting elements (e.g., pin joints connecting the aero system to the fuselage) via one or more actuators. In another example the control system can disengage one or more connecting elements (e.g., pin joints connecting the aero system to the fuselage) by communicating directly to one or more actuators via electrical signals. Other examples exist. In some embodiments, the fuselage contains an optional backup water-propulsion system that can be engaged when the fuselage has been disengaged from the aero system and enters the water, and the control system can initiate the backup water-propulsion system based on determining that the fuselage is submerged in water (acts 440 and 450).

Figure 5:
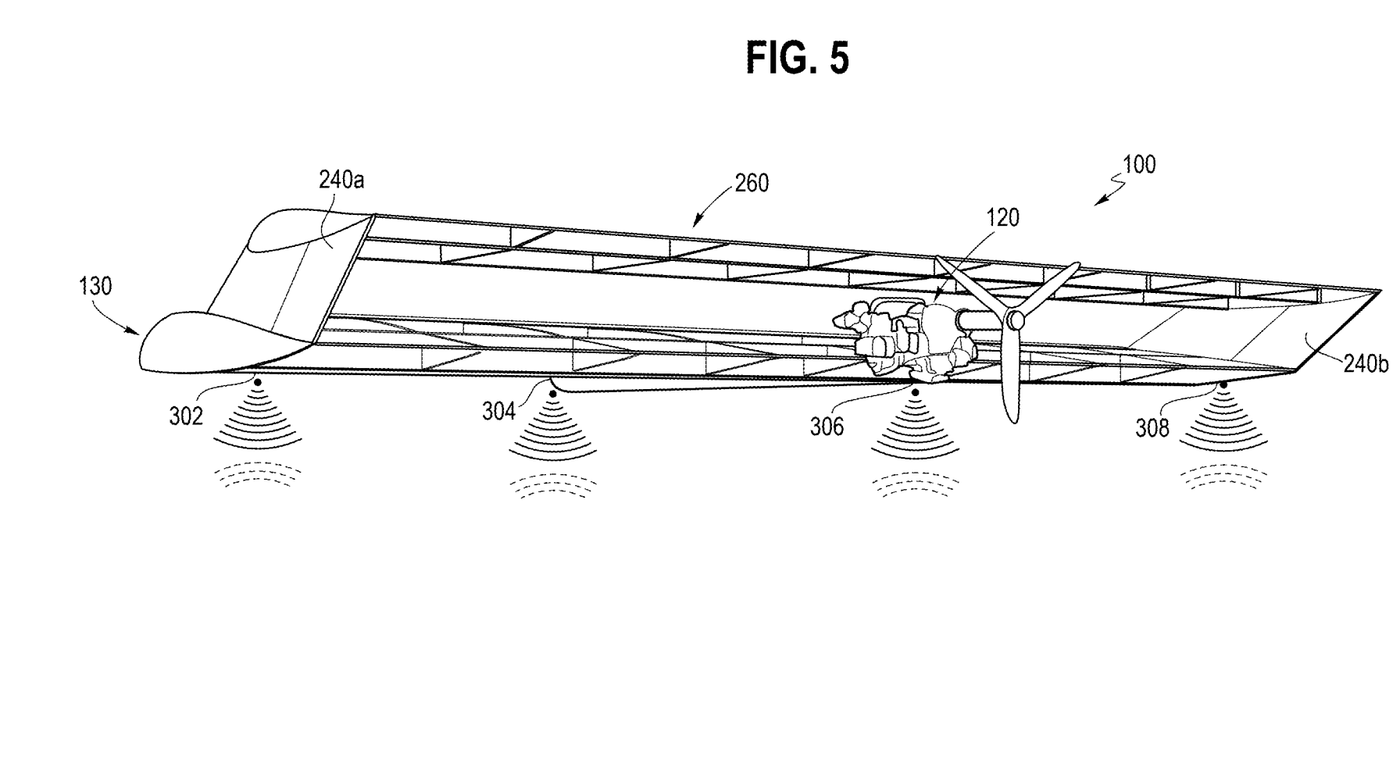
FIG. 5 is a rear perspective view of an example craft of an embodiment.

Any suitable mechanism can be used to control the craft 100. For example, one or more processors can execute computer-readable program code (e.g., a control algorithm) that optimizes for maintaining distance between the craft 100 and the surface of the water. Distance can be more important than changing airspeed as the craft 100 flies within the contour of the waves. The craft 100 can have an inertial navigation system (INS) on board and can use a simple sensor design to augment or replace INS (e.g., for altitude, pitch, and roll detection) without the need for an inertial measurement unit (IMU). For example, FIG. 5 shows an example using four ultrasonic sensors 302, 304, 306, and 308. Also, all four sensors can be used to determine the height above the water. The fore/aft sensors can also be used to determine the pitch, and the wing-tip sensors can also be used to determine the roll. Sensors 304 and 306 (i.e., for/aft of the fuselage 110) can provide pitch indication as well as height above the water (e.g., essentially using a difference in the distance above the water from for/aft sensors to determine pitch). The two sensors on the wing tips (302 and 308) can provide roll indication (e.g., essentially using a difference in the distance above the water from the left/right sensors to determine roll). If there is a long swell/long period wave in the water, the craft 100 might contour the flight path to the changing surface (wave) of the water if it is desired for the craft 100 to be as close to water as possible. On the other hand, if there are small period waves, a filter can be applied to the height data to eliminate (or at least mitigate) the effects of the short period waves (effectively controlling for an approximately flat surface). For example, if the water is flat, the craft 100 can fly lower, but, if the water is choppier, the craft 100 can fly a little higher (e.g., while staying in a band of the ultrasonic filters (six meters in an example)).

Additionally, air navigation and flight control can be done using a relatively-inexpensive sensor (e.g., camera), although additional/alternative sensors (e.g., lasers or radar oximeters) can be used. For example, image analysis can be performed to compare an image obtained by a camera to an image of a destination.

Figure 6:
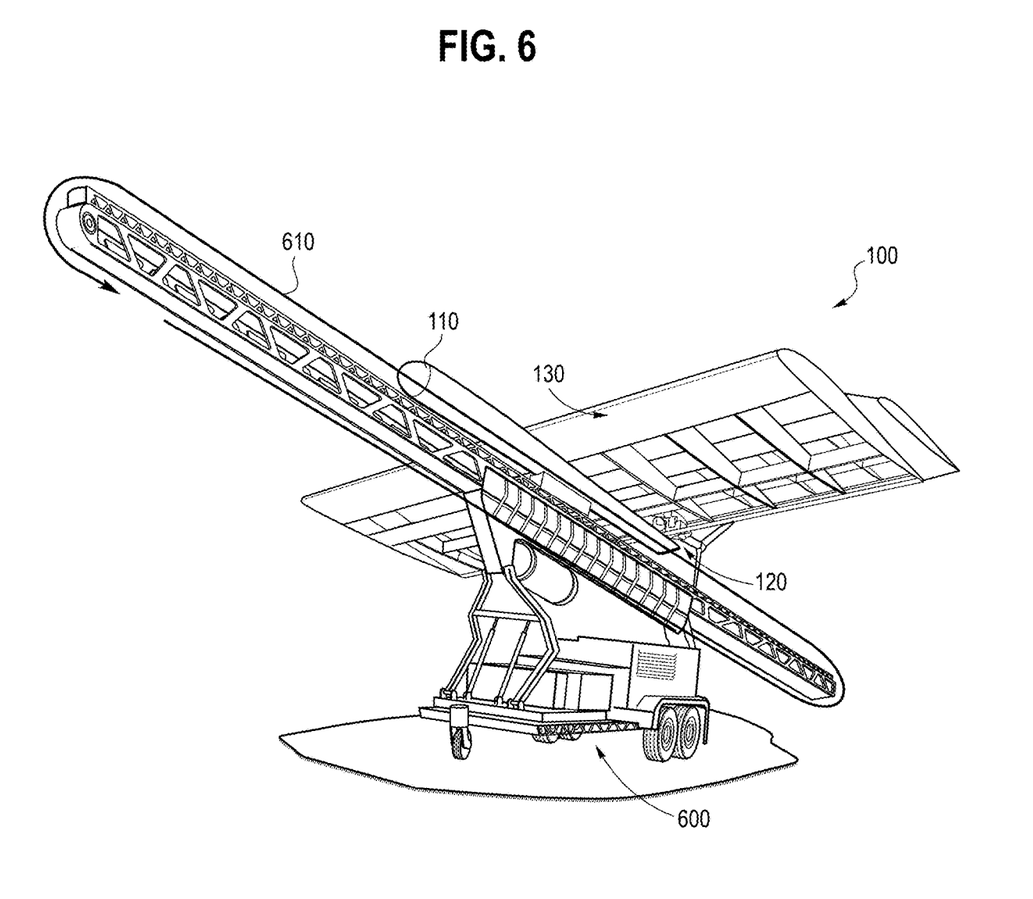
FIG. 6 is an illustration of an example craft and launcher of an embodiment.

FIG. 6 is an illustration of an example launcher 600 that can be used to facilitate takeoff of the craft 100. The launcher 600 in this example is mobile (e.g., connectable to a truck or other vehicle), so the launcher 600 can be driven to a desired location to launch the craft 100. This launcher 600 uses a ground-mount slingshot/catapult to remove runway or water takeoff requirements. As diagrammatically shown in FIGS. 6 and 7A-B, the launcher 600 in this example uses a cable/chain 610 that moves in a circular fashion. This launcher 600 can provide a rapid launch of multiple craft in a short distance simultaneously or serially (e.g., using a "magazine" design where many craft are launched in a serial and/or parallel fashion).

Figure 7A:
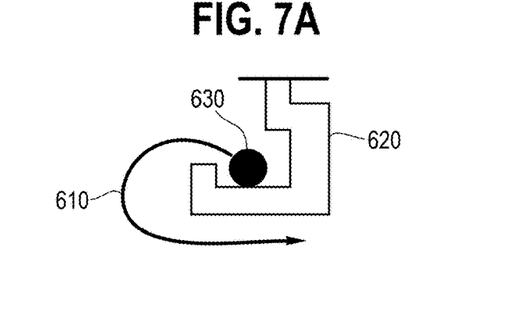
FIG. 7A-B an illustration of an example launching technique of an embodiment.

In one example shown in FIG. 7A, a hook 620 is attached to the craft 100 (e.g., at the bottom of the fuselage 110) and engages with a portion of the chain 630 to keep the fuselage in place as the chain is rapidly launched forward. As the craft 100 reaches the end of the launcher (and speeds reach an acceptable launch speed), an actuator on the fuselage 110 may be released allowing the hook to pivot backwards releasing the hold on the chain.

Figure 7B:
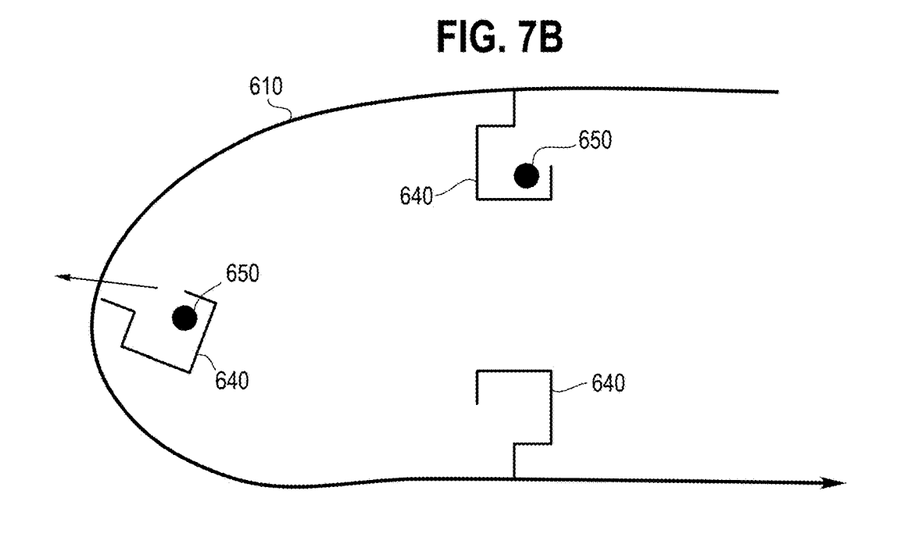

In another example shown in FIG. 7B, a hook 640 is attached to the cable/chain 610 and engages with a protrusion 650 of the craft 100 (e.g., an attaching mechanism at the bottom of the fuselage 110). As the hook 640 rounds the bend of the cable/chain 610, the craft 100 can automatically release or retract the protrusion 650 to free itself from the hook 640 for launch.

In one example embodiment, the craft 100 is launched at approximately 50 knots to avoid stalling the propeller. Also, the pitch of the launcher 600 above the ground is relatively small to launch the craft 100 relatively close to the water, which may be desired since the craft 100 in this embodiment is a WIG vehicle.

Figure 8:
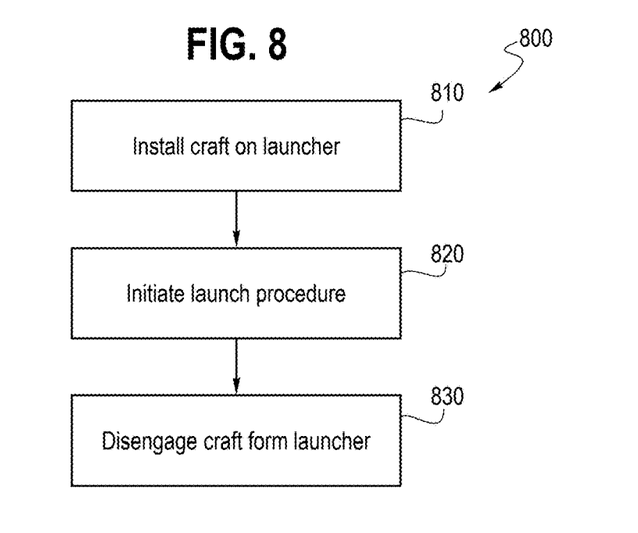
FIG. 8 is a flow chart of an example launch method of an embodiment.

FIG. 8 is a flow chart 800 of an example method for launching a craft 100 with the launcher 400. As shown in FIG. 8, the craft 100 is installed on the launcher 400 (act 810). Launch is then initiated, whereby the launcher 400 rapidly moves the craft 400 using the cable/chain 410 (act 820). Then, when the craft 100 reaches a position where it is to be launched, the craft 100 disengages from the cable/chain 410 (act 830).

Figure 9:
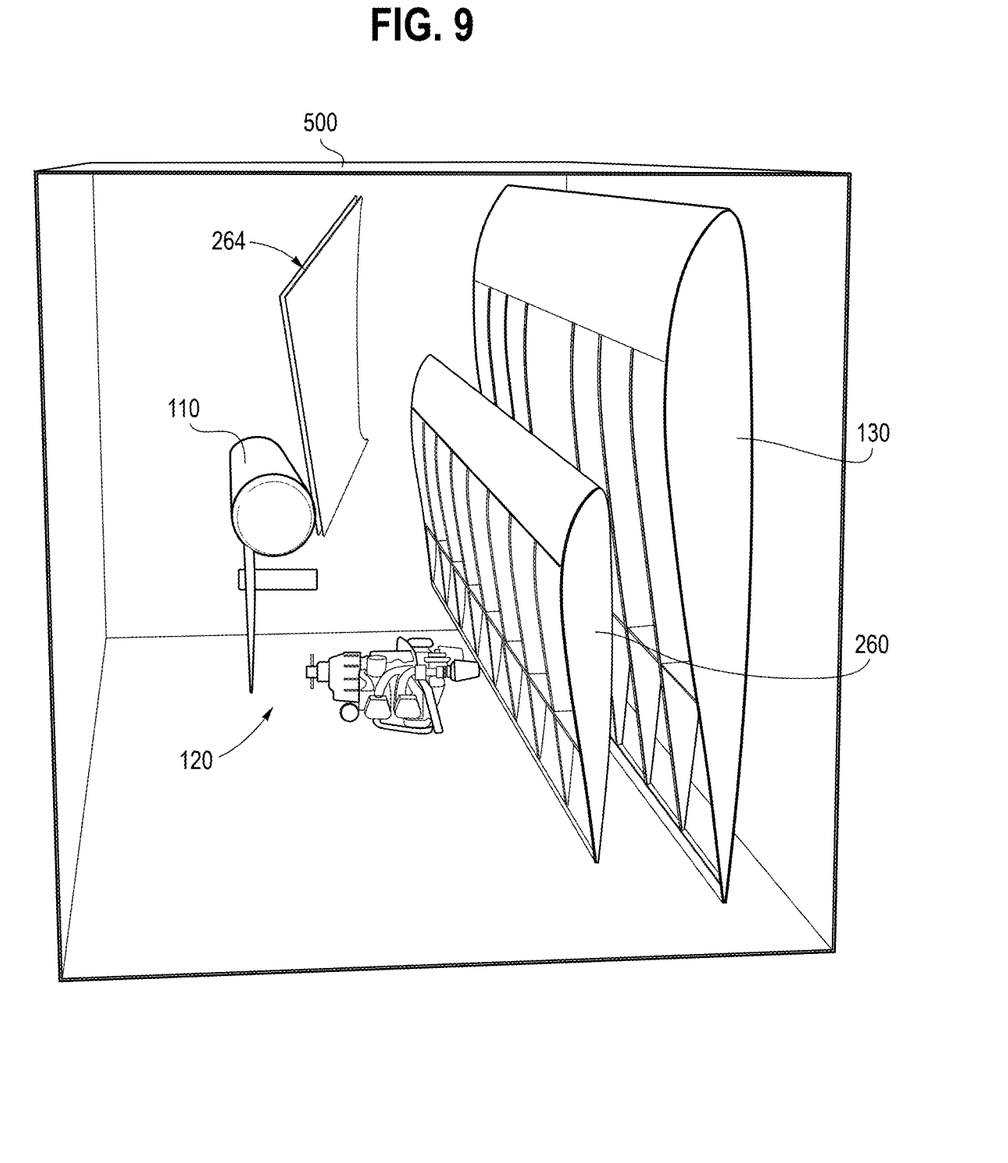
FIG. 9 is a side perspective view of an example kit of an embodiment.
Figure 10:
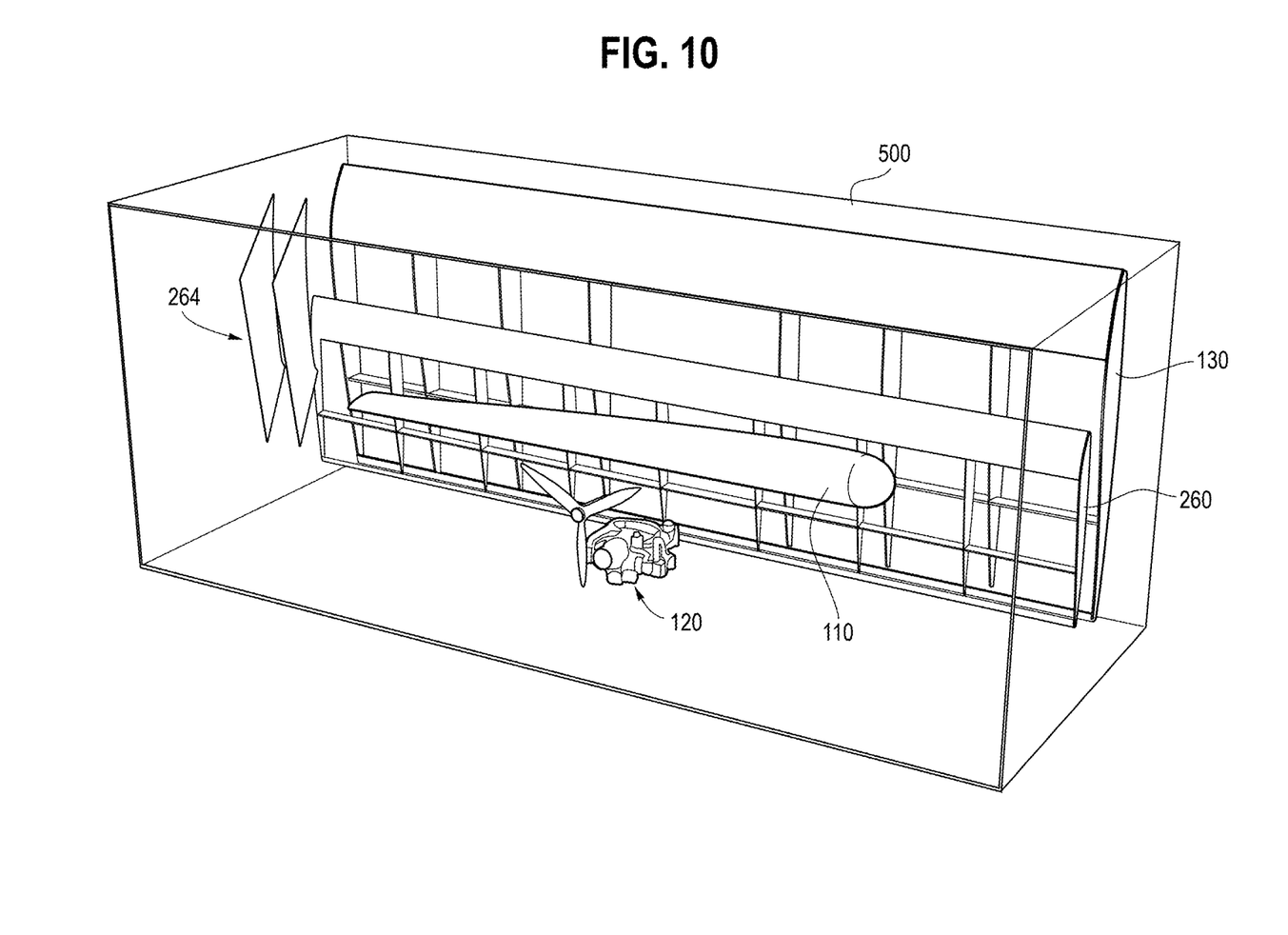
FIG. 10 is a front perspective view of an example kit of an embodiment.

Turning now to FIGS. 9 and 10, in one embodiment, the craft 100 is provided as a kit designed to be shipped in a standard CONEX-type container 500 (e.g., 10', 20', 40' containers) and assembled remotely. As shown in FIGS. 9 and 10, the fuselage 110, pre-assembled wing 130, preassembled tail top and tail sides 264, and propulsion system 120 (e.g., motor, propeller, etc.) are separated and packaged together. The separate components can be assembled in any suitable way. For example, special purpose tools can be used (e.g., to ensure waterproof electrical connections) or simple/standard tools can be used, so that the kit can be pre-packaged as much as possible. Also, while FIGS. 9 and 10 show all the components in one box, in other implementation, multiple boxes are used (e.g., one for wing(s) for one or more crafts, one full of tails for one or more crafts, etc.). Also, a "cart" apparatus can be included (e.g., bolted on the side of the container 500) to assist in moving heavy components, such as the propulsion system 120. In some implementations, the container 500 can be leveraged for the purpose of lifting the motor and/or lifting and holding various components of the aircraft into place during assembly (i.e., use the container to anchor hoists to lift objects (container fitted out)). Overall, it may be desired for the control architecture to be very simple, with potentially other components being added on to make the appearance of the craft 100 more threatening (e.g., a "serious incendiary", a great number of crafts, etc.) or less threatening (e.g., a high-speed boat).

III. Conclusion

Various examples of systems, devices, and/or methods have been described herein. Any embodiment, implementation, and/or feature described herein as being an "example" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein. Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, terms such as "A coupled to B" or "A is mechanically coupled to B" do not require members A and B to be directly coupled to one another. It is understood that various intermediate members may be utilized to "couple" members A and B together.

Moreover, terms such as "substantially" or "about" that may be used herein, are meant that the recited characteristic, parameter, or value need not be achieved exactly but that deviations or variations, including, for example, tolerances, measurement error, measurement accuracy limitations and other factors known to skill in the art, may occur in amounts that do not preclude the effect the characteristic was intended to provide.

While the systems and methods of operation have been described with reference to certain examples, it will be understood by those skilled in the art that various changes can be made, and equivalents can be substituted without departing from the scope of the claims. Therefore, it is intended that the present methods and systems not be limited to the particular examples disclosed, but that the disclosed methods and systems include all embodiments falling within the scope of the appended claims.

What is claimed is:
1. A craft comprising:
a propulsion system;
a fuselage configured to carry a payload;
a wing coupled to the fuselage, the wing comprising:
    a first spar and a second spar, wherein the first spar and the second spar are arranged substantially perpendicular to the fuselage;
    a plurality of ribs, wherein each rib extends between the first spar and the second spar, and wherein each rib is arranged substantially parallel to the fuselage; and
    at least one surface comprising a flexible membrane;

a control system comprising data storage having instruction code stored thereon that, when executed by one or more processors, causes the craft to:
fly above water at a distance above the water that is less than one fourth of a chord length of the wing;
while flying above the water, determine that a condition of the craft meets a criterion; and
after determining that the condition meets the criterion, disengage the fuselage from the wing.

2. The craft of claim 1, wherein the fuselage is further configured to carry fuel for the propulsion system, wherein the fuselage is coupled with the propulsion system.

3. The craft of claim 1, wherein the criterion comprises the craft being within a threshold distance of the water.

4. The craft of claim 1, wherein the criterion comprises the craft being in contact with the water.

5. The craft of claim 1, wherein the criterion comprises the craft being within a threshold distance of a destination.

6. The craft of claim 1, wherein the criterion comprises at least one of (a) the craft determining the craft has been damaged and (b) the craft determining the craft may become damaged.

7. The craft of claim 1, wherein the criterion comprises the craft receiving a signal transmitted by a remote device.

8. The craft of claim 1, wherein disengaging the fuselage comprises disengaging one or more connecting elements via one or more actuators.

9. The craft of claim 1, wherein the data storage further has instruction code stored thereon that, when executed by one or more processors, causes the craft to:
after disengaging the fuselage from the wing, propell the fuselage within the water.

10. The craft of claim 9, wherein the propulsion system is a first propulsion system, and the craft further comprises a second propulsion system, wherein propelling the fuselage within the water comprises propelling the fuselage within the water via the second propulsion system.

11. The craft of claim 1, wherein at least one of (a) the first spar comprises a D-tube (b) and the second spar comprises carbon.

12. The craft of claim 1, wherein the wing further comprises one or more control surfaces.

13. The craft of claim 1, further comprising a box tail.

14. The craft of claim 13, wherein the box tail comprises a first side panel comprising a first rudder and a second side panel comprising a second rudder.

15. The craft of claim 1, wherein the fuselage comprises the control system, at least one sensor, and at least one battery.

16. The craft of claim 1, wherein the wing further comprises a plurality of ultrasonic sensors affixed to a bottom surface of the wing.

17. The craft of claim 1, wherein the craft does not comprise either a hydrofoil or a wheel.

18. The craft of claim 1, further comprising an attaching mechanism configured to attach the craft to a launcher.

* * * * *

UNITED STATES PATENT AND TRADEMARK OFFICE
CERTIFICATE OF CORRECTION

PATENT NO. : 12,503,255 B2
APPLICATION NO. : 18/929946
DATED : December 23, 2025
INVENTOR(S) : William Bryan Baker et al.

Page 1 of 1

It is certified that error appears in the above-identified patent and that said Letters Patent is hereby corrected as shown below:

In the Claims

In Column 10, Claim 9, Line 1, delete "propell" and replace with --propel--.

In Column 10, Claim 17, Line 24, after "comprise" delete "cither" and replace with --either--.

Signed and Sealed this
Third Day of February, 2026

John A. Squires
*Director of the United States Patent and Trademark Office*